United States Patent [19]

Menju et al.

[11] 4,382,276
[45] May 3, 1983

[54] AC-DC ELECTRIC POWER CONVERTING STATION

[75] Inventors: Shinichi Menju, Atsugi; Isao Kamata, Sagamihara, both of Japan

[73] Assignee: Tokyo Shibaura Denki Kabushiki Kaisha, Kawasaki, Japan

[21] Appl. No.: 282,586

[22] Filed: Jul. 13, 1981

[30] Foreign Application Priority Data

Jul. 16, 1980 [JP] Japan .................................. 55-97228

[51] Int. Cl.³ .......................................... H02M 7/155
[52] U.S. Cl. ................................................. 363/141
[58] Field of Search ...................... 363/35, 37, 51, 141, 363/144; 361/332, 333, 379; 357/80-82

[56] References Cited

U.S. PATENT DOCUMENTS 4,080,645 3/1978 Schilling et al. ................. 363/141 X
4,318,169 3/1982 Olsson ............................. 363/144 X

FOREIGN PATENT DOCUMENTS 1071706 2/1980 Canada.

OTHER PUBLICATIONS

Clark, "High-Power d.c. Converter Systems for JET", GEC Journal of Science & Technology, vol. 46, No. 3, 1980, pp. 139-147.
IEEE-PES Summer Meeting, Jul. 20-25, 1975, "Compact HVDC Converter Station Design Considerations" by P. Lips, p. 5, FIG. 9, Layout of a Compact 2400 MW HVDC Converter Station with Air Insulated Valves; p. 7, FIG. 10, Comparison of Terminal Dimensions for Different Valve Technologies.

Primary Examiner—William M. Shoop
Assistant Examiner—Peter S. Wong
Attorney, Agent, or Firm—Oblon, Fisher, Spivak, McClelland & Maier

[57] ABSTRACT

An AC-DC electric power converting station is provided wherein circuit lines consisting of converter transformers/ positive and negative polarity valve structures/ DC reactors/ DC circuit breakers are of L-shape and inverted L-shape. The positive and negative polarity valve structures are so arranged that their surfaces in the longitudinal direction face each other. The converting transformers are arranged along the other surfaces of the positive and negative polarity valve structures in the longitudinal direction thereof. The DC reactors and DC circuit breakers are series-connected in the vicinities of the outputs in the direction of width of the positive and negative polarity valve structures. AC and DC switchgears of gas insulated type are arranged to face each other so that they sandwich the positive and negative polarity valve structures therebetween. Conduit air cables connect the positive and negative polarity valve structures and the AC and DC switchgears.

5 Claims, 3 Drawing Figures

4,382,276

AC-DC ELECTRIC POWER CONVERTING STATION

BACKGROUND OF THE INVENTION

The present invention relates to an AC-DC electric power converting station in a DC transmission system. More particularly, the present invention relates to an AC-DC electric power converting station wherein constituting equipment is so arranged that the land area for the station may be greatly reduced.

Electric power systems have recently been required to transmit increasingly great amounts of electric power. The tendency is to use a high transmission voltage for DC transmission to a remote place, as in the case of AC transmission. For example, some AC-DC electric power converting stations in current operation are of $\pm 250$ KV class. In the prior art AC-DC electric power converting stations, the arrangement of equipment is generally determined based on the utilization of air insulation.

For transmission of power in the 10,000 MW class, constituting equipment of UHV (ultra high voltage) class is required for both AC transmission systems and DC transmission systems. In the case of UHV class transmission, the necessary air insulation distance separating adjacent transmission lines supported by transmission pylons becomes great. Accordingly, the land area occupied by the transmission lines, and the land area for the transmission facility, also become great. For these reasons, DC transmission, which requires a smaller air insulation distance, is advantageous over AC transmission in that the required land area may be reduced and effective insulation may be easily established.

For example, in the case of 10,000 MW DC transmission, requirements for transmission capacity may be satisfied by equipment of $\pm 500$ KV class, so only insulation corresponding to 500 KV AC transmission need be performed.

When, as in the case of the prior art AC-DC electric power converting stations, the arrangement of the constituting equipment of the station of $\pm 500$ KV class is determined based on the utilization of air insulation, the land area necessary for such a station may be slightly reduced from that necessary for the AC transmission but nevertheless still remains great.

As a solution to this problem, it is possible to gas-insulate the switchgears of the station to make them compact in size, to thereby reduce the land area required for the station.

However, reducing the size of the switchgears does not significantly contribute to reduction of the overall station size.

An arrangement of equipment based on the utilization of air insulation as used with a prior art AC-DC electric power converting station of 10,000 MW class will now be described with reference to FIGS. 1 and 2.

FIG. 1 is a single line diagram of a prior art AC-DC electric power converting station. Circuit breakers $12_1$ to $12_4$ are arranged in a double bus/four bus tie system to AC side buses $10_1$ and $10_2$. The first and second circuit breakers $12_1$ and $12_2$ are arranged for the AC side buses $10_1$ and $10_2$, respectively, and the buses $10_1$ and $10_2$ are connected to each other through both the third and fourth circuit breakers $12_3$ and $12_4$. Disconnecting switches $14_0$ and $16_0$ are arranged at opposite sides of the third circuit breaker $12_3$. Disconnecting switches $14_{19}$ and $16_{19}$ are similarly arranged at opposite sides of the fourth circuit breaker $12_4$.

The buses $10_1$ and $10_2$ are connected to an AC transmission line (not shown) via a first cable head $20_1$ through a disconnecting switch $22_1$, a circuit breaker $24_1$, and disconnecting switches $14_2$ and $16_2$. Similarly, the buses $10_1$ and $10_2$ are connected to the AC transmission line described above via second to fourth cable heads $20_2$ to $20_4$, respectively, as follows: through a disconnecting switch $22_2$, a circuit breaker $24_2$, and disconnecting switches $14_6$ and $16_6$; through a disconnecting switch $22_3$, a circuit breaker $24_3$, and disconnecting switches $14_{13}$ and $16_{13}$; and through a disconnecting switch $22_4$, a circuit breaker $24_4$, and disconnecting switches $14_{17}$ and $16_{17}$.

A first phase modifier $26_1$ is connected to the buses $10_1$ and $10_2$ through a circuit breaker $28_1$ and disconnecting switches $14_1$ and $16_1$, and a second phase modifier $26_2$ is connected to the buses $10_1$ and $10_2$ through a circuit breaker $28_2$ and disconnecting switches $14_{18}$ and $16_{18}$.

A first converter $30_1$ comprises thyristor valves $32_1$ to $32_4$. The valves $32_1$ and $32_2$ constitute a high voltage stage $34_1$, and the valves $32_3$ and $32_4$ constitute a low voltage stage $34_2$. The high voltage stage $34_1$ is connected to the output of a first converter transformer $36_1$, and the low voltage stage $34_2$ is connected to the output of a second converter transformer $36_2$. The inputs of the first and second converter transformers $36_1$ and $36_2$ are commonly connected and are connected to the buses $10_1$ and $10_2$ through a circuit breaker $38_1$ and disconnecting switches $14_3$ and $16_3$.

A second converter $30_2$ comprises thyristor valves $32_5$ to $32_8$ and has a negative low voltage stage $34_3$ and a negative high voltage stage $34_4$. The negative low voltage stage $34_3$ and the negative high voltage stage $34_4$ are respectively connected to the outputs of third and fourth converter transformers $36_3$ and $36_4$. The inputs of the third and fourth converter transformers $36_3$ and $36_4$ are commonly connected and are connected to the buses $10_1$ and $10_2$ through a circuit breaker $38_2$ and connecting switches $14_5$ and $16_5$.

An AC filter $40_1$ is connected to the buses $10_1$ and $10_2$ through a circuit breaker $38_3$ and disconnecting switches $14_4$ and $16_4$.

The cathode of the thyristor valve $32_1$ is connected to DC side positive bus lines $50_1$ and $50_2$ through a first DC reactor $42_1$, a circuit breaker $44_1$, and disconnecting switches $46_1$ and $48_1$. In addition, the anode of the thyristor valve $32_8$ is connected to DC side negative bus lines $56_1$ and $56_2$ through a second DC reactor $42_2$, a circuit breaker $44_2$, and disconnecting switches $52_1$ and $54_1$.

The anode of the thyristor valve $32_4$ is connected to the cathode of the thyristor valve $32_5$ through disconnecting switches $58_1$ and $60_1$. A node of the disconnecting switches $58_1$ and $60_1$ is connected to a neutral conductor N through a disconnecting switch $62_1$.

The first to fourth converter transformers $36_1$ to $36_4$, the first and second converters $30_1$ and $30_2$, the first and second DC reactors $42_1$ and $42_2$, and the circuit breakers $44_1$ and $44_2$ constitute a first unit converting apparatus $64_1$.

The constructions of second to fourth unit converting apparatuses $64_2$ to $64_4$ are the same as that of the first converting apparatus $64_1$. The second converting apparatus $64_2$ is connected to the buses $10_1$ and $10_2$ through a circuit breaker $38_4$ and disconnecting switches $14_7$ and $16_7$; a circuit breaker $38_6$ and disconnecting switches $14_8$ and $16_8$; and a circuit breaker $38_5$ and disconnecting switches $14_9$ and $16_9$. The third converting apparatus $64_3$ is connected to the buses $10_1$ and $10_2$ through a circuit breaker $38_7$ and disconnecting switches $14_{10}$ and $16_{10}$; a circuit breaker $38_9$ and disconnecting switches $14_{11}$ and $16_{11}$; and a circuit breaker $38_8$ and disconnecting switches $14_{12}$ and $16_{12}$. The fourth converting apparatus $64_4$ is connected to the buses $10_1$ and $10_2$ through a circuit breaker $38_{10}$ and disconnecting switches $14_{14}$ and $16_{14}$; a circuit breaker $38_{12}$ and disconnecting switches $14_{15}$ and $16_{15}$; and a circuit breaker $38_{11}$ and disconnecting switches $14_{16}$ and $16_{16}$.

To DC side positive bus lines $50_1$ and $50_2$ are connected a high voltage stage (not shown) of the second unit converting apparatus $64_2$ through a circuit breaker $44_3$ and disconnecting switches $46_3$ and $48_3$; a high voltage stage (not shown) of the third unit converting apparatus $64_3$ through a circuit breaker $44_5$ and disconnecting switches $46_5$ and $48_5$; and a high voltage stage (not shown) of the fourth unit converting apparatus $64_4$ through a circuit breaker $44_7$ and disconnecting switches $46_6$ and $48_6$.

To DC side negative bus lines $56_1$ and $56_2$ are connected a negative high voltage stage (not shown) of the second unit converting apparatus $64_2$ through a circuit breaker $44_4$ and disconnecting switches $52_2$ and $54_2$; a negative high voltage stage (not shown) of the third unit converting apparatus $64_3$ through a circuit breaker $44_6$ and disconnecting switches $52_4$ and $54_4$; and a negative high voltage stage (not shown) of the fourth unit converting apparatus $64_4$ through a circuit breaker $44_8$ and disconnecting switches $52_6$ and $54_6$.

The DC side positive bus lines $50_1$ and $50_2$ are connected to each other at one end through a circuit breaker $58$ and disconnecting switches $46_7$ and $48_7$ and are of the double bus system. The DC side negative bus lines $56_1$ and $56_2$ are connected to each other at one end through a circuit breaker $60$ and disconnecting switches $52_0$ and $54_0$ and are of the double bus system.

The DC side positive bus lines $50_1$ and $50_2$ are connected to a positive DC transmission line (not shown) via a DC side first cable head $64_1$ through disconnecting switches $46_2$ and $48_2$ and a circuit breaker $62_1$ and via a DC side second cable head $64_2$ through disconnecting switches $46_4$ and $48_4$ and a circuit breaker $62_2$. The neutral conductor N is connected to a neutral transmission line (not shown) via DC side third and fourth cable heads $64_3$ and $64_4$ through circuit breakers $62_3$ and $62_4$, respectively. The DC negative bus lines $56_1$ and $56_2$ are connected to a negative DC transmission line (not shown) via a DC side fifth cable head $64_5$ through disconnecting switches $52_3$ and $54_3$ and a circuit breaker $62_5$ and via a DC side sixth cable head $64_6$ through disconnecting switches $52_5$ and $54_5$ and a circuit breaker $62_6$.

A first DC filter $66_1$ is inserted between the DC side first and third cable heads $64_1$ and $64_3$. A second DC filter $66_2$ is inserted between the sixth and third cable heads $64_6$ and $64_3$. A third DC filter $66_3$ is inserted between the DC side second and fourth cable heads $64_2$ and $64_4$. A fourth DC filter $66_4$ is connected between the DC side fifth and fourth heads $64_5$ and $64_4$.

The disconnecting switches $22_1$ to $22_4$; the circuit breakers $24_1$ to $24_4$, the AC side buses $10_1$ and $10_2$, the disconnecting switches $14_0$ to $14_{19}$ and $16_0$ to $16_{19}$, the circuit breakers $38_1$ to $38_{12}$, the circuit breakers $28_1$ and $28_2$, and the circuit breakers $12_1$ to $12_4$ constitute an AC side gas insulated switchgear $68$. The DC side positive bus lines $50_1$ and $50_2$, the disconnecting switches $46_1$ to $46_7$ and $48_1$ to $48_7$, the DC side negative bus lines $56_1$ and $56_2$, the disconnecting switches $52_0$ to $52_6$ and $54_0$ to $54_6$, the circuit breakers $60$ and $62_1$ to $62_6$, and the first to fourth DC filters $66_1$ to $66_4$ constitute a DC side gas insulated switchgear $70$.

FIG. 2 schematically shows an example of the arrangement of the constituent equipment of the prior art AC-DC electric power converting station shown by the single line diagram of FIG. 1 according to the air insulation system. The same reference numerals as in FIG. 1 denote the same parts. Referring to FIG. 2, a radiator $72$ dissipates heat generated by the converter transformers $36_1$ to $36_4$ and so on for cooling.

When the arrangement of equipment is accomplished based on the utilization of air insulation, a land area of about $770 \text{ m} \times 510 \text{ m} = 392,700 \text{ m}^2$ is required, as shown in FIG. 2.

As may further be seen from FIG. 2, a wider space is required for replacement of equipment in case of breakdown of the thyristor valves $32_1$ to $32_8$ and so on.

SUMMARY OF THE INVENTION

It is, therefore, the primary object of the present invention to provide an AC-DC electric power converting staton which retains the functionality of the prior art AC-DC electric power converting station while it secures the space necessary for part replacement in case of an accident such as breakdown of parts, and which enables a great reduction in the land area required for the station.

This object has been attained by the AC-DC electric power converting station which includes a gas-insulated AC side switchgear having first and second longitudinal sides opposite each other, and first and second transverse sides opposite each other; a gas-insulated DC side switchgear having third and fourth transverse sides opposite each other, and arranged opposite to the gas-insulated AC side switchgear with the third longitudinal side facing the second longitudinal side of the AC side switchgear; at least one first group of semiconductor switching elements, each group enclosed within a first valve structure of positive polarity, which has fifth and sixth longitudinal sides opposite each other, and fifth and sixth transverse sides opposite each other, and which is arranged between the AC and DC side switchgears with the fifth transverse side parallel to the second longitudinal side of the AC side switchgear, and the sixth transverse side parallel to the third longitudinal side of the DC side switchgear; at least one second group of semiconductor switching elements connected to the first group of semiconductor switching elements, each group enclosed within a second valve structure of negative polarity which has seventh and eighth longitudinal sides opposite each other, and seventh and eighth transverse sides opposite each other, and which is so arranged that the seventh transverse side is parallel to the second longitudinal side of the AC side switchgear, the eighth transverse side is parallel to the third longitudinal side of the DC side switchgear, and the seventh longitudinal side faces the sixth longitudinal side of the first valve structure; first and second converter transformers respectively connected to the first and second groups of semiconductor switching elements, and respectively arranged in opposition to the fifth and eighth longitudinal sides of the first and second valve structures; first and second DC circuit breakers respectively connected to the first and second groups of semiconductor switching elements, and respectively arranged in opposition to the sixth and eighth transverse sides of the first and second valve structures, and between the DC side switchgear and the pair of first and second valve structures; first and second DC reactors respectively connected between the first group of semiconductor switching elements and the first DC circuit breaker and between the second group of semiconductor switching elements and the second circuit breaker, the first DC reactor arranged between the first valve structure and the first DC circuit breaker, and the second DC reactor arranged between the second valve structure and the second circuit breaker; first conduit cables extending to connect the first and second valve structures to the AC side switchgear; second conduit cables extending to connect the first and second valve structures to the DC side switchgear.

With the equipment arrangement of the AC-DC electric power converting station of the present invention, the circuit line formed by the converter transformers, for the valve structures of positive polarity/the valve structures of positive polarity/the DC reactors/and the DC circuit breakers, is of L-shape; and the circuit line formed by the converter transformers, for the valve structures of negative polarity/the valve structures of positive polarity/the DC reactors/and the DC circuit breakers, is of inverted L-shape. Due to this arrangement, the space required for responding to an accident (e.g., replacement of damaged equipment or the like) may be greatly reduced as compared with that required by the prior art station. Furthermore, since the conduit cables are used for the lines between the AC and DC side switchgears and the valve structures of positive and negative polarities, the space which has been hitherto required for these cables may also be eliminated. In accordance with the present invention, the land area for the AC-DC electric power converting station may be greatly reduced.

BRIEF DESCRIPTION OF THE DRAWINGS

By way of example and to make the description clearer, reference is made to the accompanying drawings in which.

DETAILED DESCRIPTION OF THE PREFERRED EMBODIMENTS

Figure 1:
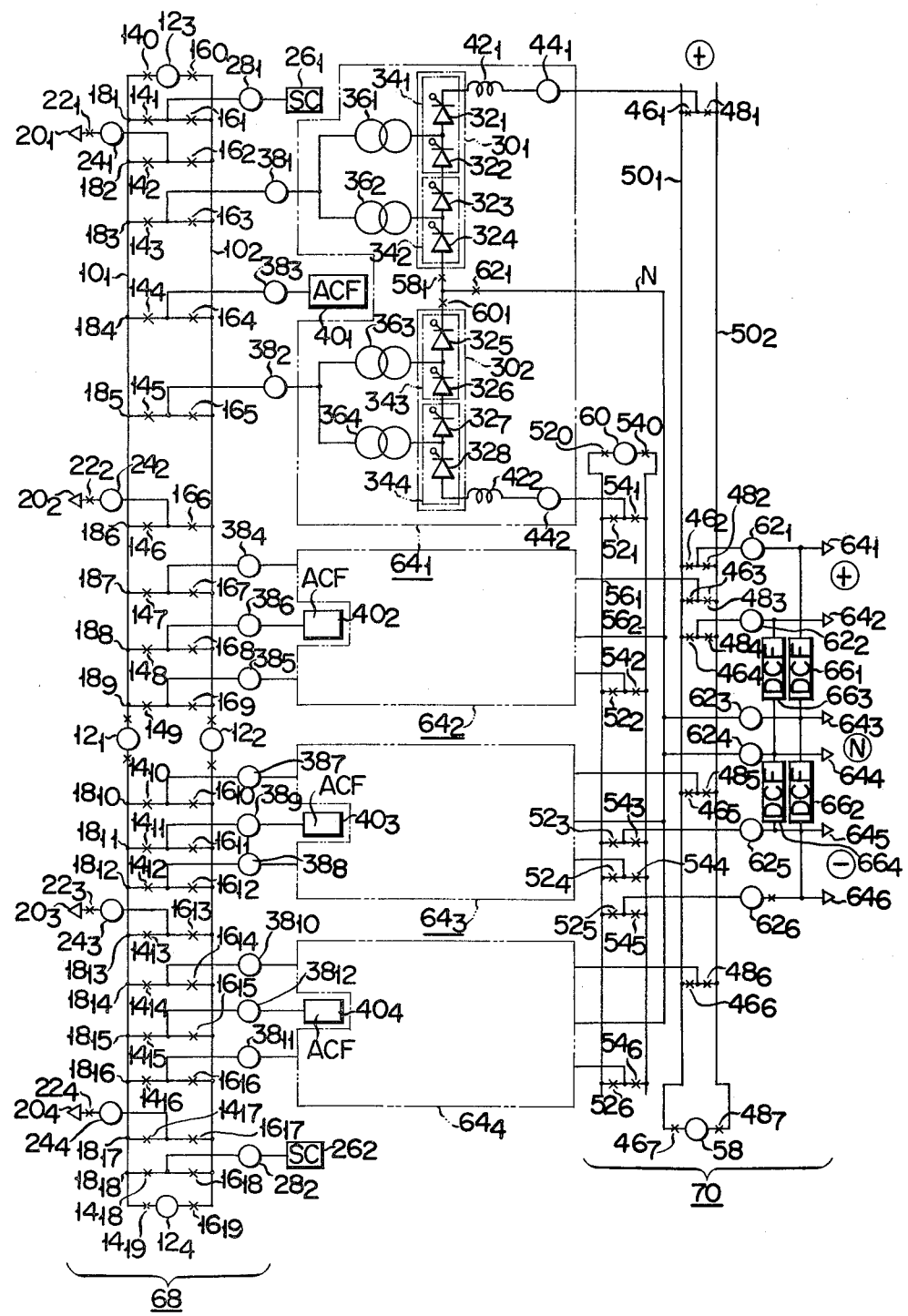
FIG. 1 is a single line diagram of a prior art AC-DC electric power converting station.
Figure 3:
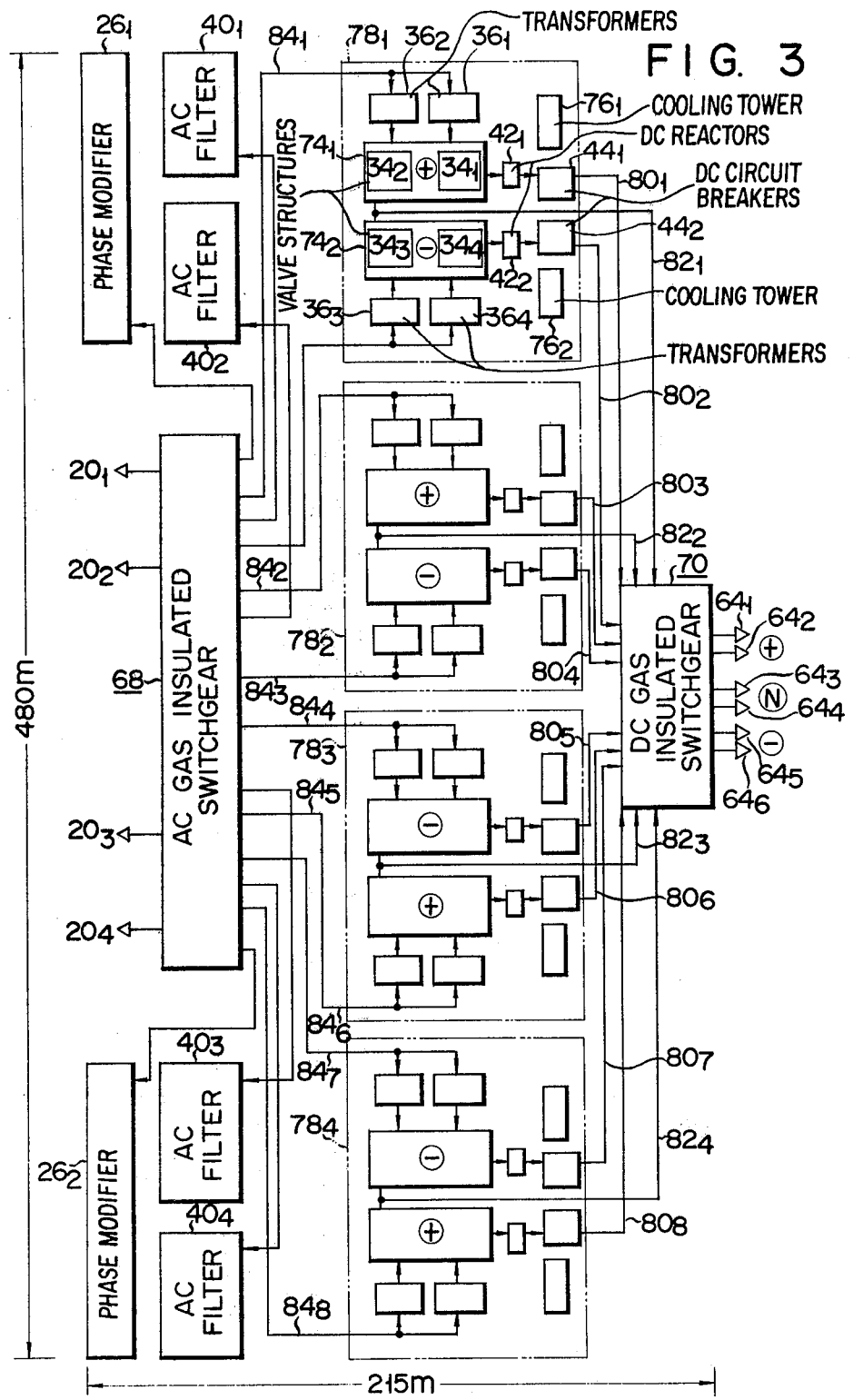
FIG. 3 is a view showing the arrangement of the equipment of an AC-DC electric power converting station according to the present invention.

FIG. 3 is a view showing the arrangement of the equipment of an AC-DC electric power converting station according to an embodiment of the present invention which is accomplished based on the single line diagram of the prior art AC-DC electric power converting station shown in FIG. 1. The same reference numerals denote the same parts as in FIG. 1.

A positive polarity valve structure $74_1$ houses the positive side thyristor valves $32_1$ to $32_4$ of air insulation type. A negative polarity valve structure $74_2$ houses the negative side thyristor valves $32_5$ to $32_8$ of air insulation type. The thyristor valves of the low voltage stage $34_2$ and the high voltage stage $34_1$ are series-connected in the longitudinal direction of the valve structure $74_1$. Similarly, the thyristor valves of the low voltage stage $34_3$ and the high voltage stage $34_4$ are series-connected in the longitudinal direction of the valve structure $74_2$. Therefore, as shown in the figure, the low voltage stages $34_2$ and $34_3$ and the high voltage stages $34_1$ and $34_4$ of the valve structures $74_1$ and $74_2$ are arranged to oppose each other. The positive side thyristor valves $32_1$ to $32_4$ are only required to be disposed separately from the negative side thyristor valves $32_5$ to $32_8$. Therefore, the positive polarity valve structure $74_1$ housing the positive side thyristor valves $32_1$ to $32_4$ and the negative polarity valve structure $74_2$ housing the negative side thyristor valves $32_5$ to $32_8$ may be connected with a connecting housing portion or share a wall which separates them from each other to form a larger housing. Also the separating wall is not required. DC output terminals of the two groups of thyristors are so arranged to be located at the right ends of the valve structures $74_1$ and $74_2$ in FIG. 3.

The converter transformers $36_2$ and $36_1$, respectively, of the low voltage stage $34_2$ and the high voltage stage $34_1$ of the valve structure $74_1$ are arranged along the outer surface in the longitudinal direction of the valve structure $74_1$. Similarly, the converter transformers $36_3$ and $36_4$, respectively, of the low voltage stage $34_3$ and the high voltage stage $34_4$ of the valve structure $74_2$ are arranged along the outer surface in the longitudinal direction of the valve structure $74_2$.

The DC reactor $42_1$ connected to the high voltage stage $34_1$ of the valve structure $74_1$ is connected to the right side of the valve structure $74_1$ in FIG. 3. The circuit breaker $44_1$ is arranged to the right of the DC reactor $42_1$. In the figure, a cooling tower $76_1$ for the thyristor valves $32_1$ to $32_4$ is arranged in the vicinity above the circuit breaker $44_1$.

The DC reactor $42_2$ connected to the high voltage stage $34_4$ of the valve structure $74_2$ is arranged to the right of the valve structure $74_2$ in the figure. The circuit breaker $44_2$ is arranged to the right of the DC reactor $42_2$. Referring to the figure, a cooling tower $76_2$ for the thyristor valves $32_5$ to $32_8$ is arranged in the vicinity below the circuit breaker $44_2$.

The paired valve structures $74_1$ and $74_2$, the converter transformers $36_1$ to $36_4$, the DC reactors $42_1$ and $42_2$, the DC circuit breakers $44_1$ and $44_2$, and the cooling towers $76_1$ and $76_2$ constitute a first unit converting apparatus $78_1$.

Second to fourth unit converting apparatuses $78_2$ to $78_4$ are arranged in planar form in the vertical direction of the figure. The second to fourth unit converting apparatuses $78_2$ to $78_4$ are of the same construction as that of the first unit converting apparatus $78_1$. The number of these unit converting apparatuses may be varied as necessary.

The DC side gas-insulated switchgear 70 is arranged to the right of and near these converting apparatuses $78_1$ to $78_4$. The AC side gas-insulated switchgear 68 is arranged to the left of and near these unit converting apparatuses $78_1$ to $78_4$.

AC filters $40_1$ and $40_2$, respectively, for the first and second unit converting apparatuses $78_1$ and $78_2$ are arranged in the vicinity above the AC side gas insulated switchgear 68 of the figure. The first phase modifier $26_1$ is arranged to the left and near the AC filters $40_1$ and $40_2$. AC filters $40_3$ and $40_4$, respectively, for the third and fourth unit converting apparatuses $78_3$ and $78_4$ are arranged in the vicinity below the AC side gas insulated switchgear 68. The second phase modifier $26_2$ is arranged to the left of and near the AC filters $40_3$ and $40_4$.

The DC outputs of the first to fourth unit converting apparatuses $78_1$ to $78_4$ are connected to the DC side gas-insulated switchgear 70 through DC side conduit cables $80_1$ to $80_8$ respectively. The neutral outputs of the first to fourth converting apparatuses $78_1$ to $78_4$ are connected to the DC side gas-insulated switchgear 70 through conduit cables $82_1$ to $82_4$ of the neutral conductor.

The inputs of the converter transformers $36_1 \ldots$ of the first to fourth unit converting apparatuses $78_1$ to $78_4$ are connected to the AC side gas insulated switchgear 68 through AC side conduit cables $84_1$ to $84_8$.

In summary, according to this embodiment, the AC and DC switchgears 68 and 70 are gas insulated to reduce their bulks, and the conduit cables $80_1$ to $80_8$, $82_1$ to $82_4$, and $84_1$ to $84_8$ are used for the group of buses so that the space for accommodating them may be reduced to the minimum.

Figure 2:
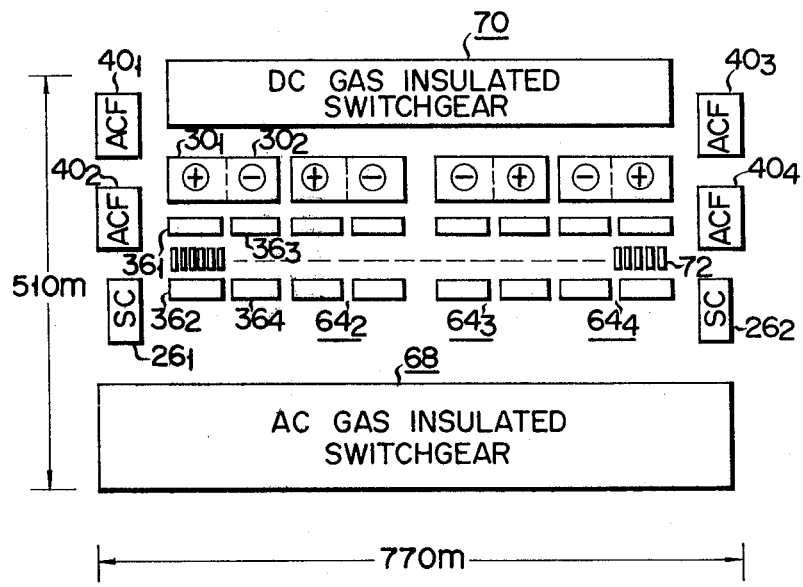
FIG. 2 is a view showing the arrangement of the equipment of the prior art AC-DC electric power converting station of the circuit of FIG. 1 according to the air insulation system.

Further, according to this embodiment, the positive polarity valve structure $74_1$ and negative polarity valve structure $74_2$ are so arranged that their surfaces in the longitudinal direction face each other. The converter transformers $36_1$ to $36_4$ are arranged in the vicinities of the other surfaces of the valve structures $74_1$ and $74_2$ in the longitudinal directions thereof. The DC reactors $42_1$ and $42_2$ are series-connected to the right and near the valve structures $74_1$ and $74_2$ in FIG. 3. The DC circuit breakers $44_1$ and $44_2$ are respectively arranged to the right and near the DC reactors $42_1$ and $42_2$. Thus, the circuit line consisting of the converter transformers $36_1$ and $36_2$/the valve structure $74_1$/the DC reactor $42_1$/and the DC circuit breaker $44_1$ may be of L-shape. On the other hand, the circuit line consisting of the converter transformers $36_3$ and $36_4$/the valve structure $74_2$/the DC reactor $42_2$/and the DC circuit breaker $44_2$ may be of inverted L-shape. This arrangement facilitates replacement of damaged equipment in the case of an accident and allows reduction in the space as compared with the arrangement of the prior art station shown in FIG. 2. Thus, the land area required for the AC-DC electric power converting station of the embodiment incorporating the first to fourth unit converting apparatuses $78_1$ to $78_4$ of the constructions as described above is vastly reduced compared to that required for the prior art AC-DC electric power converting station shown in FIG. 2.

Describing the particular example of the land area required for the AC-DC electric power converting station of this embodiment, it is about 480 m in length and about 215 m in width as shown in FIG. 3. It follows that the land area of this embodiment is about 103,200 $m^2$. Accordingly, this land area is about ¼ the land area (392,700 $m^2$) of the prior art AC-DC electric power converting station shown in FIG. 2.

It is to be noted that the present invention is not limited to the particular embodiment described above, and various other modifications may be made within the spirit and scope of the present invention.

What we claim is:

1. An AC-DC electric power converting station comprising:

a gas-insulated AC side switchgear having first and second longitudinal sides opposite each other, and first and second transverse sides opposite each other;

a gas-insulated DC side switchgear having third and fourth longitudinal sides opposite each other, and third and fourth transverse sides opposite each other, and arranged opposite to said gas-insulated AC side switchgear with the third longitudinal side facing the second longitudinal side of said AC side switchgear;

at least one first group of semiconductor switching elements, each group enclosed within a first valve structure of positive polarity, said first valve structure having fifth and sixth longitudinal sides opposite each other, and fifth and sixth transverse sides opposite each other, and arranged between said AC and DC side switchgears with the fifth transverse side parallel to the second longitudinal side of said AC side switchgear, and the sixth transverse side parallel to the third longitudinal side of said DC side switchgear;

at least one second group of semiconductor switching elements connected to said first group of semiconductor switching elements, each group enclosed within a second valve structure of negative polarity, said second valve structure having seventh and eighth longitudinal sides opposite each other, and seventh and eighth transverse sides opposite each other, and so arranged that the seventh transverse side is parallel to the second longitudinal side of said AC side switchgear, the eighth transverse side is parallel to the third longitudinal side of said DC side switchgear, and said seventh longitudinal side faces the sixth longitudinal side of said first valve structure;

first and second converter transformers respectively connected to said first and second groups of semiconductor switching elements, and respectively arranged in opposition to the fifth and eighth longitudinal sides of said first and second valve structures;

first and second DC circuit breakers respectively connected to said first and second groups of semiconductor switching elements, and respectively arranged in opposition to the sixth and eighth transverse sides of said first and second valve structures, and between said DC side switchgear and said pair of first and second valve structures;

first and second DC reactors respectively connected between said first group of semiconductor switching elements and said first DC circuit breaker and between said second group of semiconductor switching elements and said second circuit breaker, said first DC reactor arranged between said first valve structure and first DC circuit breaker, and said second DC reactor arranged between said second valve structure and said second circuit breaker;

first conduit cables extending to connect said first and second valve structures to said AC side switchgear;

second conduit cables extending to connect said first and second valve structures to said DC side switchgear.

2. An AC-DC electric power converting station according to claim 1, wherein said first and second groups of semiconductor switching elements respectively comprise:

series connections of a high voltage group and a lower voltage group.

3. An AC-DC electric power converting station according to claim 1, further comprising:

at least one AC filter connected to said AC side switchgear and arranged in opposition to at least one of the first and second transverse sides of said AC side switchgear.

4. An AC-DC electric power converting station according to claim 1, further comprising:
at least two cooling devices so arranged to be substantially parallel to the sixth and eighth transverse sides of said first and second valve structures, with said first and second DC circuit breakers interposed therebetween.

5. An AC-DC electric power converting station according to claim 3, further comprising:
phase modifiers so arranged to be in the direction of expansion of the first longitudinal side of said AC side switchgear, said at least one AC filter interposed between said phase modifiers and said pair of first and second valve structures.

* * * * *